(12) United States Patent
Motokawa et al.

(10) Patent No.: US 12,373,042 B2
(45) Date of Patent: Jul. 29, 2025

(54) POINTING DEVICE OPERATING SLEEVE

(71) Applicant: SUMITOMO RUBBER INDUSTRIES, LTD., Kobe (JP)

(72) Inventors: Yuki Motokawa, Kobe (JP); Atsushi Hirano, Kobe (JP); Satoru Yonezawa, Tokyo (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/724,141

(22) PCT Filed: Jan. 5, 2023

(86) PCT No.: PCT/JP2023/000068
§ 371 (c)(1),
(2) Date: Jun. 25, 2024

(87) PCT Pub. No.: WO2023/140113
PCT Pub. Date: Jul. 27, 2023

(65) Prior Publication Data
US 2025/0060840 A1     Feb. 20, 2025

(30) Foreign Application Priority Data
Jan. 24, 2022   (JP) .................................. 2022-008475

(51) Int. Cl.
*G06F 3/0354*  (2013.01)
*G06F 1/16*  (2006.01)

(52) U.S. Cl.
CPC .......... *G06F 3/03543* (2013.01); *G06F 1/163* (2013.01)

(58) Field of Classification Search
CPC ..... G06F 3/03543; G06F 1/163; A41D 27/10; A41D 13/08; A41D 19/015

USPC ........................................................... 345/163
See application file for complete search history.

(56) References Cited

U.S. PATENT DOCUMENTS

| | | | | |
|---|---|---|---|---|
| 4,019,506 A | * | 4/1977 | Eschmann | ................ B32B 3/20 602/8 |
| 2006/0276735 A1 | * | 12/2006 | Phelen | ............... A63B 21/4025 602/21 |
| 2023/0191115 A1 | * | 6/2023 | Blum | ..................... A61B 5/397 607/149 |

FOREIGN PATENT DOCUMENTS

| | | | |
|---|---|---|---|
| JP | 2000282312 A | * | 10/2000 |
| JP | 2001-265529 A | | 9/2001 |
| JP | 2015-92033 A | | 5/2015 |
| JP | 2020-37756 A | | 3/2020 |
| JP | 2021-25153 A | | 2/2021 |
| JP | 2021025153 A | * | 2/2021 |
| KR | 10-2020-0063111 A | | 6/2020 |

(Continued)

OTHER PUBLICATIONS

International Search Report for PCT/JP2023/000068 mailed on Mar. 7, 2023.

(Continued)

*Primary Examiner* — Mark Edwards
(74) *Attorney, Agent, or Firm* — Birch, Stewart, Kolasch & Birch, LLP

(57) ABSTRACT

A pointing device operating sleeve includes a palm cover, an arm cover, and a band. The palm cover covers a heel of a palm of a player. The arm cover is continuous with the palm cover. The arm cover covers a forearm of the player. A band is sewed on the palm cover. The band suppresses displacement of the palm cover from the palm.

11 Claims, 17 Drawing Sheets

(56) References Cited

FOREIGN PATENT DOCUMENTS

SE 546094 C2 * 5/2024 ............. A41D 13/08

OTHER PUBLICATIONS

Written Opinion of the International Searching Authority for PCT/JP2023/000068 mailed on Mar. 7, 2023.

* cited by examiner

POINTING DEVICE OPERATING SLEEVE

TECHNICAL FIELD

The present specification discloses a sleeve that is suitable for use in operating a pointing device included in, for example, a computer.

BACKGROUND ART

Mouses have been widely used as computer pointing devices. An operator moves a mouse pointer on a screen by moving a mouse on a mouse pad (or on a table). A hand or an arm of the operator rubs against the mouse pad. Japanese Laid-Open Patent Application Publication No. 2001-265529 discloses a protective gear for reducing damage to the hand of the operator operating the mouse.

CITATION LIST

Patent Literature

PTL 1: Japanese Laid-Open Patent Application Publication No. 2001-265529

SUMMARY OF INVENTION

Technical Problem

E-sports are categorized into the following seven genres: shooting games (FPS/TPS): MOBA (Multiplayer online battle arena): RTS (Real Time Strategy); fighting games; sports video games: DCG (Digital Card Games); and puzzle games. A player playing a shooting game operates a mouse to participate in the game. The player is required to have agility. The player's hand rubs intensely against the mouse pad. The protective gear disclosed by Japanese Laid-Open Patent Application Publication No. 2001-265529 is not suitable for protecting a hand of an e-sports player. Moreover, the protective gear disclosed by Japanese Laid-Open Patent Application Publication No. 2001-265529 hinders an action made by the player.

It is an intention of the applicant of the present application to provide a sleeve that sufficiently protects a hand of a person operating a pointing device and that is less likely to hinder an action made by the player.

Solution to Problem

A preferable pointing device operating sleeve includes: a palm cover configured to cover a heel of a palm; an arm cover configured to cover at least a part of a forearm, the arm cover being continuous with the palm cover; and a stopper that suppresses displacement of the palm cover from the palm.

Advantageous Effects of Invention

The above pointing device operating sleeve is suitable for protecting a hand of an e-sports player. This sleeve is less likely to cause hindrance to an action made by the player.

DESCRIPTION OF EMBODIMENTS

Hereinafter, preferred embodiments are described in detail with reference to the drawings as necessary.

Figure 1:
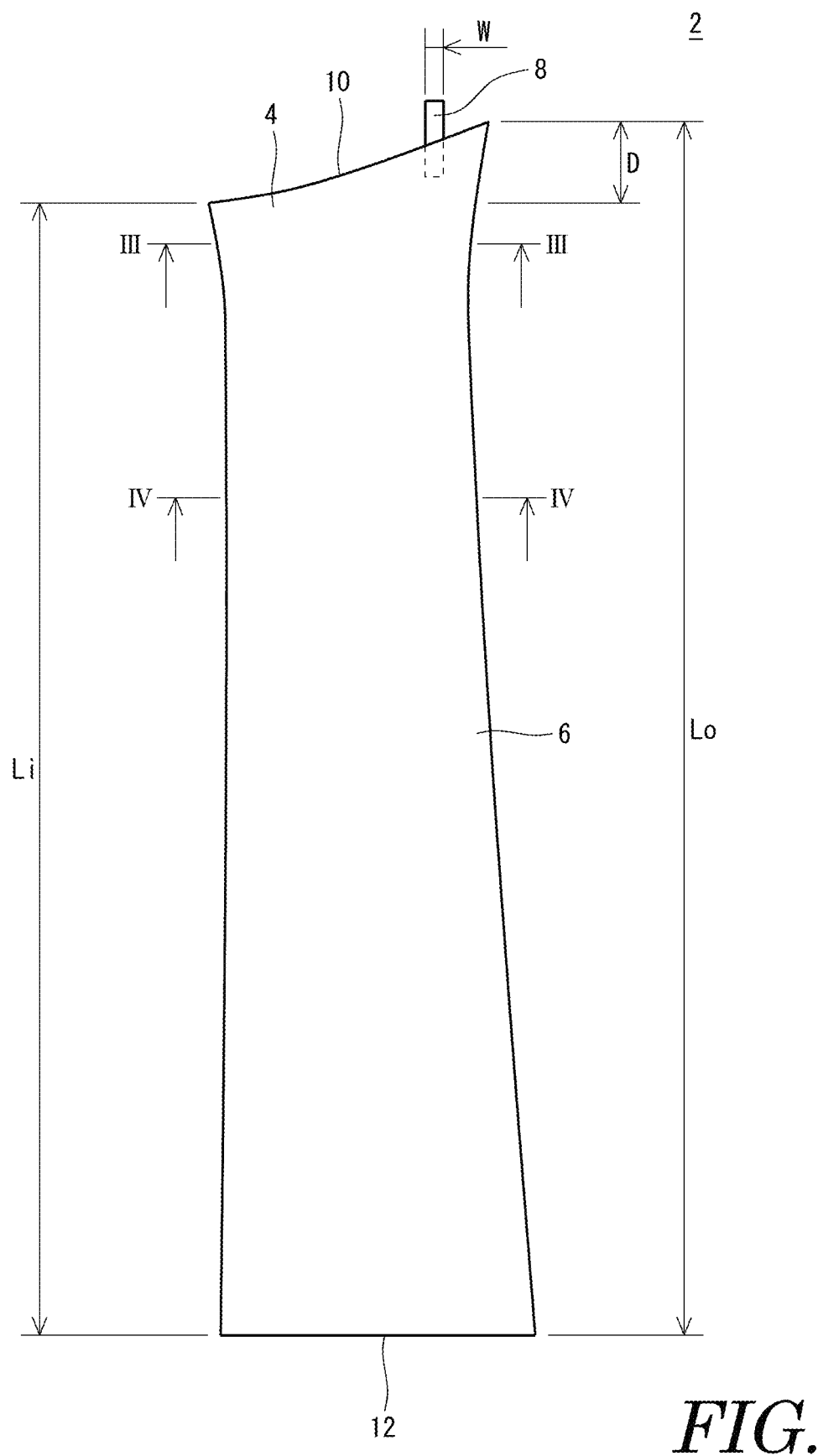
FIG. 1 is a front view showing a pointing device operating sleeve according to one embodiment.

FIGS. 1 to 4 show a pointing device operating sleeve 2, which includes a palm cover 4 and an arm cover 6. The sleeve 2 further includes a band 8, which serves as a stopper. As described below in detail, the sleeve 2 is worn on the right upper extremity of a player. Although not illustrated, a sleeve for the left upper extremity has a shape that is left-right reversed from the shape shown in FIG. 1. In FIG. 1, the right side is the outside, and the left side is the inside.

Figure 3:
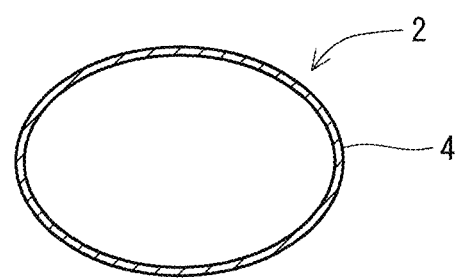
FIG. 3 is a sectional view taken along line III-III of FIG. 1.

It is clear from FIG. 3 that the palm cover 4 is tubular. The palm cover 4 includes a first opening 10. The first opening 10 is inclined relative to the left-right direction of FIG. 1 (i.e., inclined relative to the width direction of the palm cover 4). Specifically, the first opening 10 extends to the right side in a direction upward in FIG. 1.

Figure 4:
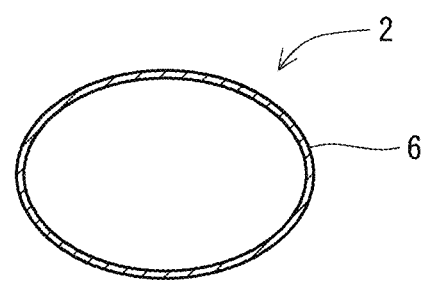
FIG. 4 is a sectional view taken along line IV-IV of FIG. 1.

It is clear from FIG. 4 that the arm cover 6 is tubular. The arm cover 6 is continuous with the palm cover 4. In the present embodiment, the arm cover 6 is integrated with the palm cover 4. Therefore, the sleeve 2 has no visible boundary between the palm cover 4 and the arm cover 6. The arm cover 6 includes a second opening 12.

Figure 2:
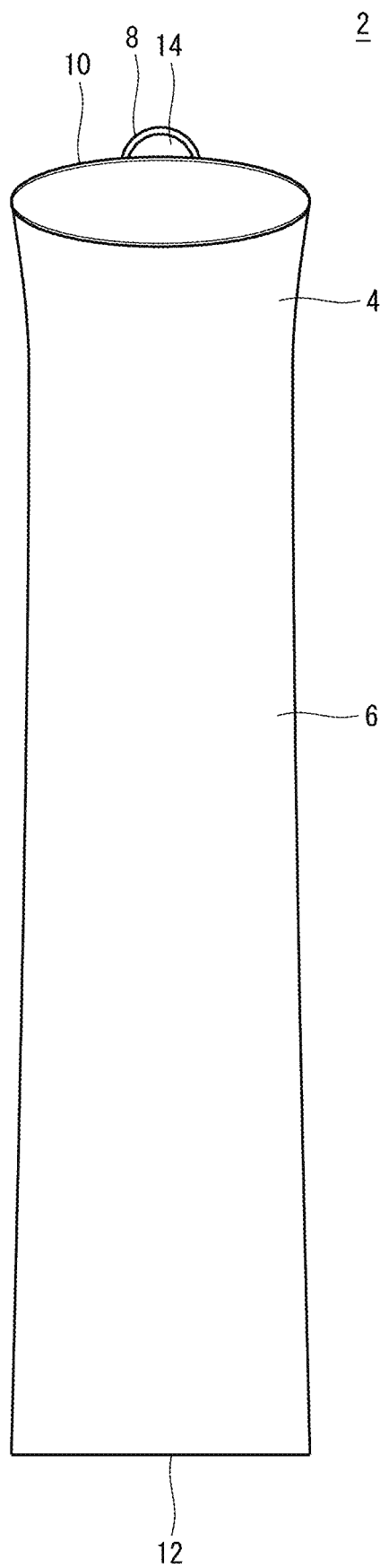
FIG. 2 is a left side view of the pointing device operating sleeve of FIG. 1.

The band 8 is attached to the palm cover 4. The attachment of the band 8 to the palm cover 4 is achieved by sewing both ends of the band 8 and their vicinities on the palm cover 4. The band 8 may be attached to the palm cover 4 not by sewing, but by other means. As shown in FIG. 2, the band 8 forms a hole 14 on the sleeve 2.

Figure 5:
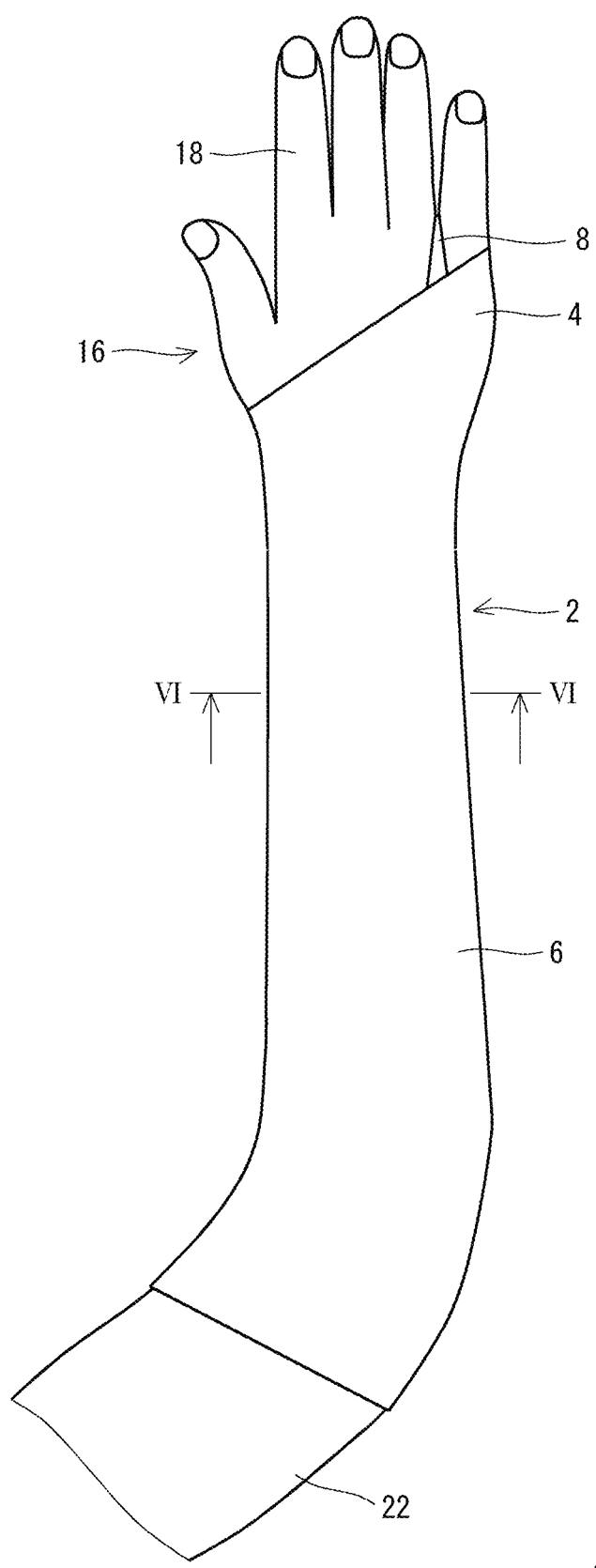
FIG. 5 is a front view showing the pointing device operating sleeve of FIG. 1 together with an upper limb of a player.

FIG. 5 is a front view showing the pointing device operating sleeve 2 of FIG. 1 together with an upper limb 16 of the player. In FIG. 5, a hand 18 is passed through the palm cover 4. It is clear from FIGS. 1 and 5 that the diameter of the palm cover 4 increases from the wrist toward the fingertips. The palm cover 4 having such a shape fits to the hand 18.

Figure 6:
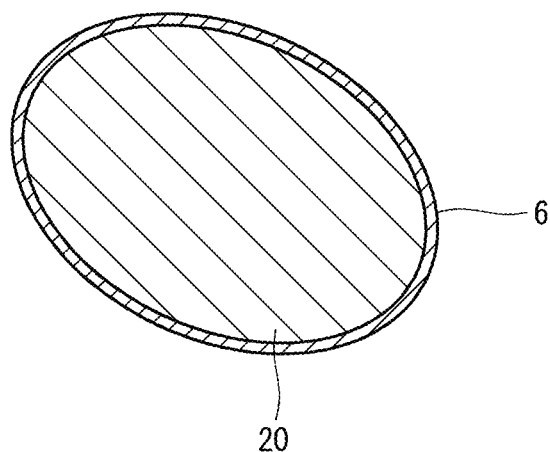
FIG. 6 is a sectional view taken along line VI-VI of FIG. 5.

A forearm 20 (see FIG. 6) is passed through the arm cover 6. The arm cover 6 covers the entire forearm 20. A part of an upper arm 22 is also passed through the arm cover 6. The arm cover 6 covers the part of the upper arm 22. It is clear from FIGS. 1 and 5 that the diameter of the arm cover 6 decreases from the elbow toward the wrist. The arm cover 6 having such a shape fits to the forearm 20.

Figure 7:
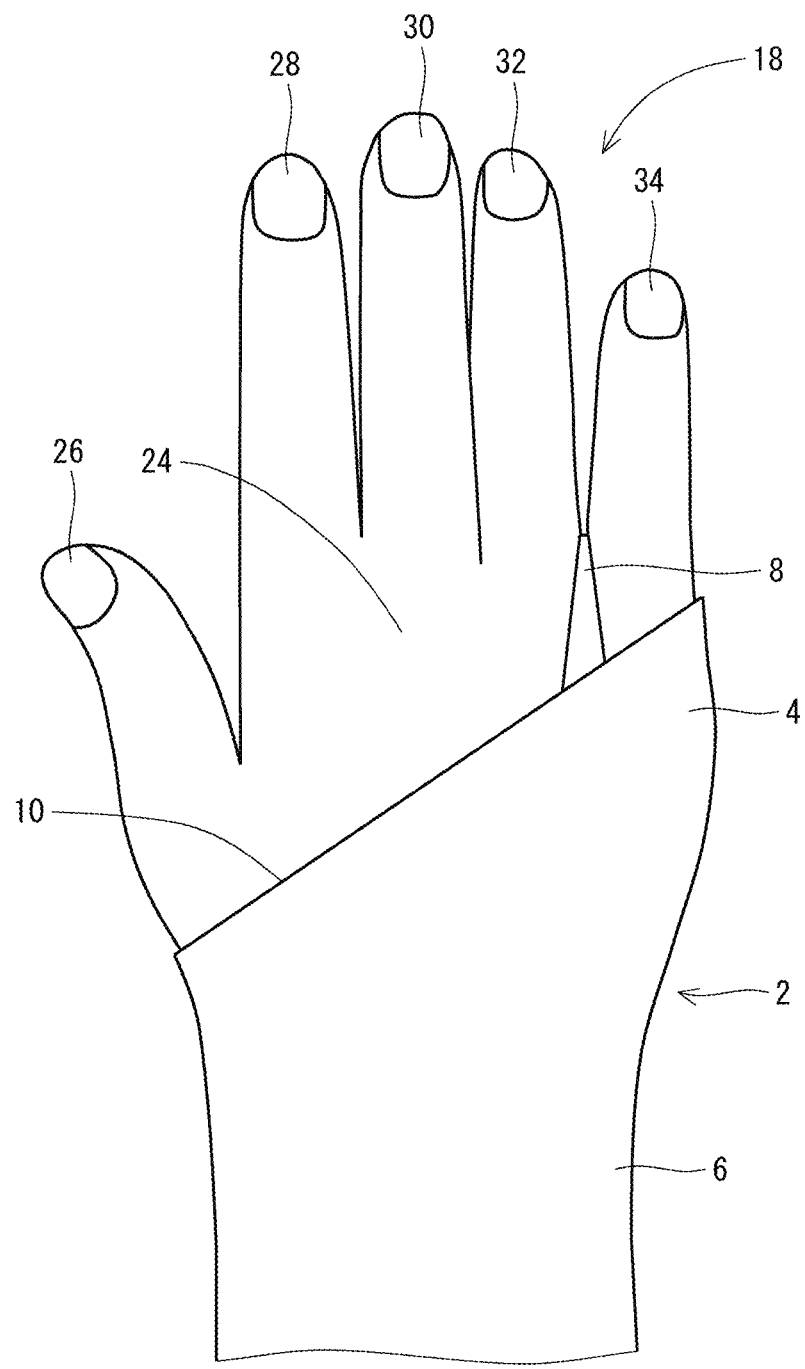
FIG. 7 is a front view showing, in an enlarged manner, a part of the pointing device operating sleeve of FIG. 5 together with a hand of the player.

FIG. 7 is a front view showing, in an enlarged manner, a part of the pointing device operating sleeve 2 of FIG. 5 together with the hand 18 of the player. FIG. 7 shows a back 24, a thumb 26, an index finger 28, a middle finger 30, a ring finger 32, and a little finger 34 of the hand 18. As previously described, the first opening 10 is inclined relative to the width direction. Specifically, the first opening 10 extends from the inside to the outside in a direction toward the fingertips. In FIG. 7, the little finger 34 is passed through the hole 14 (see FIG. 2). The sleeve 2 may include the hole 14 through which the ring finger 32 is passable. The sleeve 2 may include the hole 14 through which the little finger 34 and the ring finger 32 are passable. Preferably, the sleeve 2 includes the hole 14 through which only the little finger 34 is passed.

Figure 8:
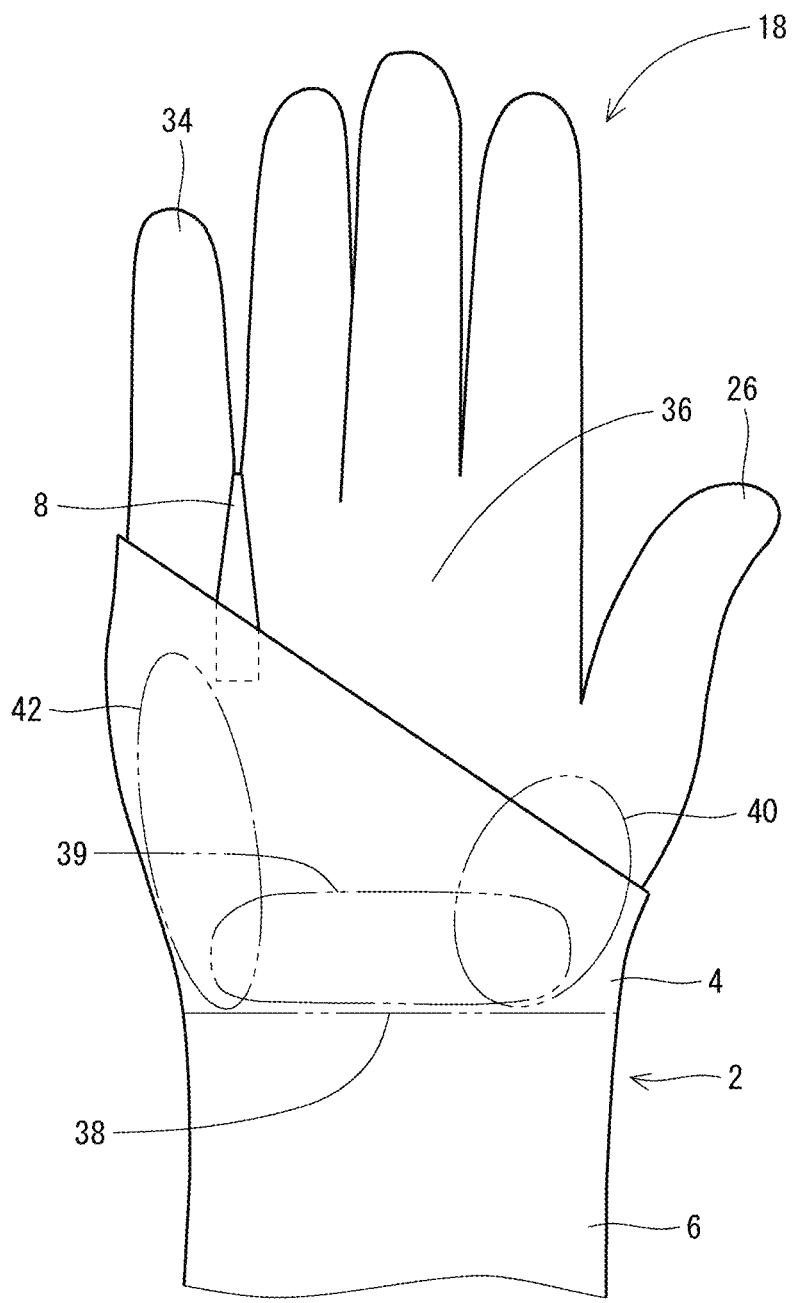
FIG. 8 is a rear view showing, in an enlarged manner, a part of the pointing device operating sleeve of FIG. 5 together with the hand of the player.

FIG. 8 is a rear view showing, in an enlarged manner, a part of the pointing device operating sleeve 2 of FIG. 5 together with the hand 18 of the player. FIG. 8 shows a palm 36. In FIG. 8, reference sign 38 indicates a wrist crease of the palm 36, and reference sign 39 indicates a palm heel. The wrist crease 38 coincides with the boundary between the forearm 20 and the palm 36. The palm heel 39 is positioned on the fingertip side of the wrist crease 38. It is clear from FIG. 8 that the palm cover 4 covers the palm heel 39. In the present embodiment, the palm cover 4 covers the entire palm heel 39.

In FIG. 8, reference sign 40 indicates a thenar eminence. The thenar eminence 40 is a fleshy mound on the palm 36 at the base of the thumb 26. It is clear from FIG. 8 that the palm cover 4 covers a part of the thenar eminence 40. The palm cover 4 may cover the entire thenar eminence 40.

In FIG. 8, reference sign 42 indicates a hypothenar eminence. The hypothenar eminence 42 is a fleshy mound on the palm 36 at the base of the little finger 34. It is clear from FIG. 8 that the palm cover 4 covers the entire hypothenar eminence 42. The palm cover 4 may cover a part of the hypothenar eminence 42.

Figure 9:
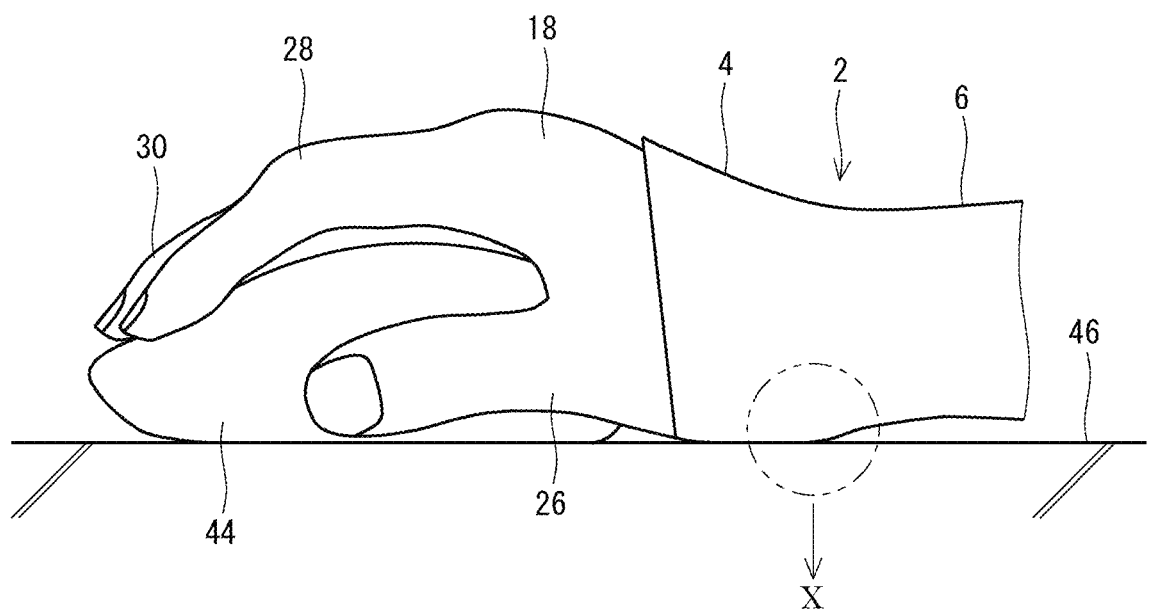
FIG. 9 shows, in an enlarged manner, a part of the pointing device operating sleeve of FIG. 5 together with the hand of the player.

FIG. 9 shows the sleeve 2 as seen from the inside. FIG. 9 further shows the hand 18 of the player, a mouse 44, and a mouse pad 46. FIG. 9 shows the thumb 26, the index finger 28, and the middle finger 30 of the hand 18. The mouse 44 is placed over the mouse pad 46. The player is holding the mouse 44 with the hand 18.

Figure 10:
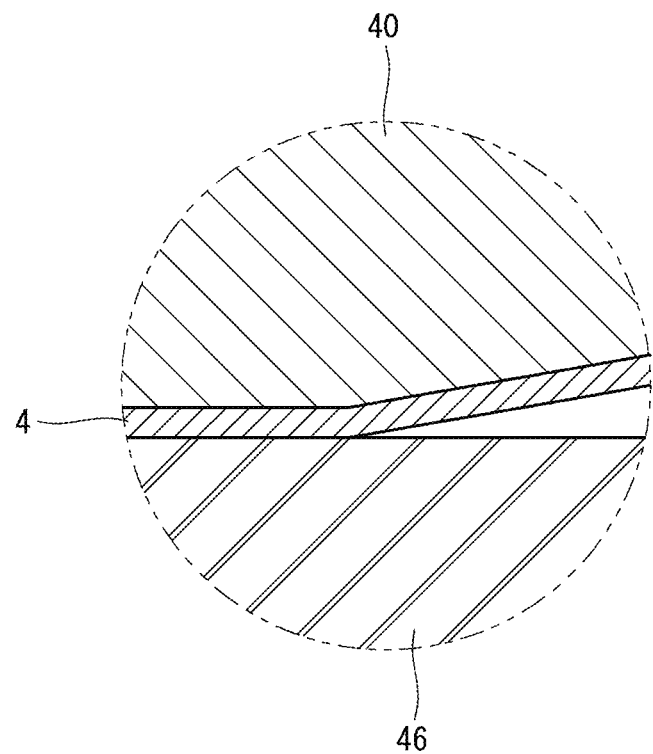
FIG. 10 is an enlarged sectional view of a zone that is denoted by reference sign X of FIG. 9.

FIG. 10 is an enlarged sectional view of a zone that is denoted by reference sign X of FIG. 9. FIG. 10 shows the thenar eminence 40, the palm cover 4, and the mouse pad 46. It is clear from FIG. 10 that the palm cover 4 is present between the thenar eminence 40 and the mouse pad 46. When the player moves the mouse 44 intensely, the palm cover 4 suppresses direct rubbing between the thenar eminence 40 and the mouse pad 46. The palm cover 4 protects the thenar eminence 40.

Figure 11:
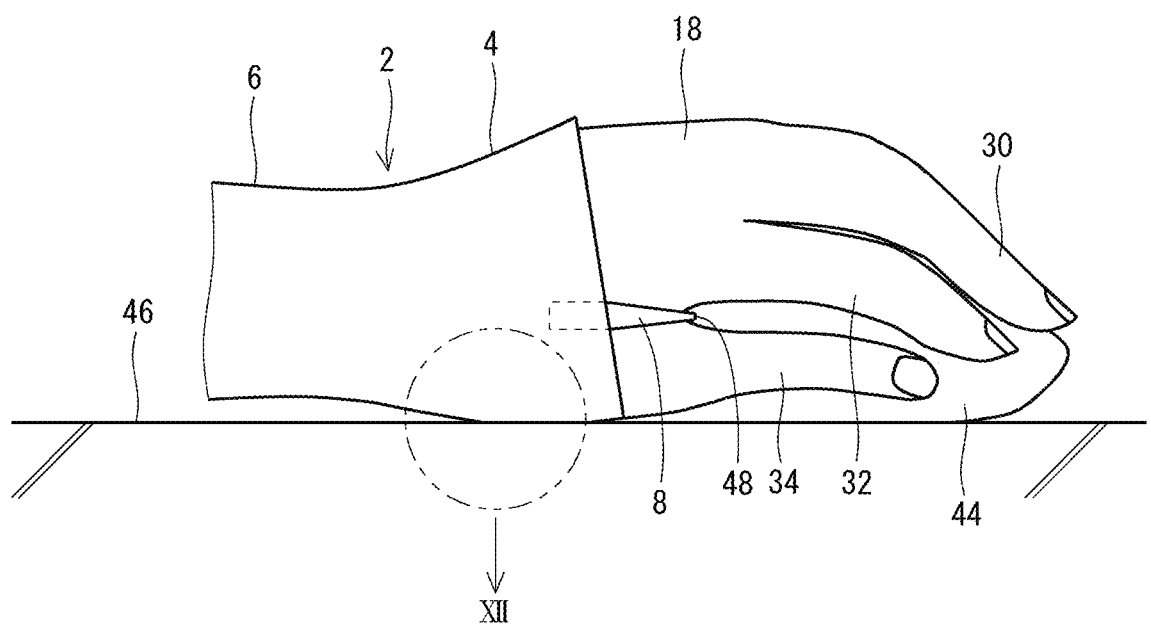
FIG. 11 shows, in an enlarged manner, a part of the pointing device operating sleeve of FIG. 5 together with the hand of the player.

FIG. 11 shows the sleeve 2 as seen from the outside. FIG. 11 further shows the hand 18 of the player, the mouse 44, and the mouse pad 46. FIG. 11 shows the middle finger 30, the ring finger 32, and the little finger 34 of the hand 18. The mouse 44 is placed over the mouse pad 46. The player is holding the mouse 44 with the hand 18.

Figure 12:
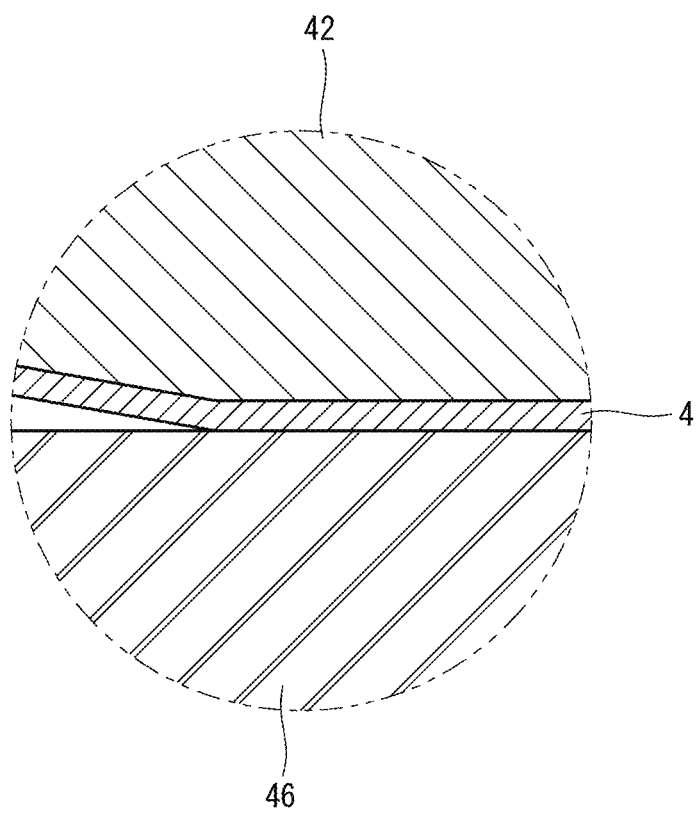
FIG. 12 is an enlarged sectional view of a zone that is denoted by reference sign XII of FIG. 11.

FIG. 12 is an enlarged sectional view of a zone that is denoted by reference sign XII of FIG. 11. FIG. 12 shows the hypothenar eminence 42, the palm cover 4, and the mouse pad 46. It is clear from FIG. 12 that the palm cover 4 is present between the hypothenar eminence 42 and the mouse pad 46. When the player moves the mouse 44 intensely, the palm cover 4 suppresses direct rubbing between the hypothenar eminence 42 and the mouse pad 46. The palm cover 4 protects the hypothenar eminence 42.

As shown in FIG. 11, the band 8 is engaged with a web 48 between the ring finger 32 and the little finger 34. Since the band 8 is attached to the palm cover 4, the band 8 suppresses the palm cover 4 from moving to the left in FIG. 11. In other words, the band 8 suppresses displacement of the palm cover 4 from the palm 36. The sleeve 2 is less likely to cause exposure of the thenar eminence 40 and the hypothenar eminence 42. Further, the sleeve 2 is less likely to cause hindrance to an action made by the player, the hindrance being due to displacement of the palm cover 4.

Since the little finger 34 or the ring finger 32 is passed through the hole 14, the band 8 is away from the thumb 26, the index finger 28, and the middle finger 30. Further, as previously described, the first opening 10 is inclined. Accordingly, as shown in FIG. 7, each of the thumb 26, the index finger 28, and the middle finger 30 is entirely exposed. The sleeve 2 does not hinder movements of the thumb 26, the index finger 28, and the middle finger 30 of the player. Therefore, the player can readily operate the buttons of the mouse 44 with the thumb 26, the index finger 28, or the middle finger 30.

In FIG. 1, an arrow Lo represents the length of the outside of the sleeve 2, and an arrow Li represents the length of the inside of the sleeve 2. The lengths Lo and Li are measured in a manner to exclude the band 8. As previously described, the first opening 10 extends from the inside to the outside in a direction toward the fingertips. Accordingly, the distance Lo is greater than the distance Li.

In FIG. 1, an arrow D represents a height difference between the outside and the inside of the first opening 10. The difference D is preferably greater than or equal to 5 mm, more preferably greater than or equal to 10 mm, and particularly preferably greater than or equal to 15 mm from the viewpoints that the palm cover 4 sufficiently protects the hypothenar eminence 42 and that the sleeve 2 is less likely to hinder movements of the thumb 26, the index finger 28, and the middle finger 30. The difference D is measured in a state where nothing is passed through the sleeve 2. The difference D is measured in a state where no force, except the gravitational force, is applied to the sleeve 2.

In FIG. 1, an arrow W indicates the width of the band 8. The width W is preferably less than or equal to 20 mm, more preferably less than or equal to 12 mm, and particularly preferably less than or equal to 8 mm from the viewpoint that the band 8 is less likely to hinder movements of the hand 18 of the player.

In the present embodiment, the material of the arm cover 6 and the material of the palm cover 4 are the same. The arm cover 6 may include a material that is different from the material of the palm cover 4. Each of the palm cover 4 and the arm cover 6 may be obtained from a woven fabric, or may be obtained from a knitted material.

Preferably, the palm cover 4 has elasticity. The palm cover 4 having elasticity fits to the hand 18 of the player. Preferable examples of the material of the palm cover 4 include polyester, polyurethane, nylon, rayon, and acrylic. The material of the palm cover 4 may be a mixture of a plurality of raw materials. The material of the palm cover 4 may be spandex.

Preferably, the arm cover 6 has elasticity. The arm cover 6 having elasticity and an internal diameter less than the diameter of the forearm 20 of the player moderately tightens the forearm 20. Such moderate tightening can reduce fatigue of the forearm 20. Preferable examples of the material of the arm cover 6 include polyester, polyurethane, nylon, rayon, and acrylic. The material of the arm cover 6 may be a mixture of a plurality of raw materials. The material of the arm cover 6 may be spandex.

The material of the band 8 may be an elastic material or a non-elastic material. Examples of the non-elastic material include cotton.

Preferably, the palm cover 4 has a low frictional property. The palm cover 4 having a low frictional property does not hinder movements of the hand 18 of the player. Preferably, the palm cover 4 is more slidable against the mouse pad 46 than the hand 18 (i.e., human skin) is.

Preferably, the arm cover 6 has a low frictional property. The arm cover 6 having a low frictional property does not hinder movements of the forearm 20 of the player. Preferably, the arm cover 6 is more slidable against the mouse pad 46 than the forearm 20 (i.e., human skin) is. Preferably, the arm cover 6 is more slidable against a table than the forearm 20 (i.e., human skin) is.

E-sports players can be roughly categorized, based on their play style, into low sensitivity players and high sensitivity players. A low sensitivity player operates the mouse 44 in a state where the heel of the palm 36, the vicinity of the heel of the palm 36, and the forearm 20 are placed on the mouse pad 46. In a case where the palm cover 4 or the arm cover 6 of the sleeve 2 has a low frictional property, the sleeve 2 is useful for the low sensitivity player.

Each of the palm cover 4 and the arm cover 6 may be formed of a sweat-absorbing material. The sleeve 2 including the sweat-absorbing material can reduce the influence of sweat on mouse operation. This sleeve 2 can also contribute to the player's performance in e-sports competitions. Each of the palm cover 4 and the arm cover 6 may be formed of a sweat-impermeable material.

The band 8 may be attached to the palm cover 4 by a hook-and-loop fastener. The band 8 thus configured is attachable to and detachable from the palm cover 4. The player can wear the sleeve 2 in a state where the band 8 is detached from the palm cover 4. Further, the player can adjust an attachment position where the band 8 is attached to the palm cover 4 to make the hole 14 be in a desired size. The band 8 attachable to and detachable from the palm cover 4 may be realized by different means other than the hook-and-loop fastener.

The sleeve 2 is also suitable for operating a pointing device different from the mouse 44. For example, the sleeve 2 is also suitable for operating a stick and a track ball.

Figure 13:
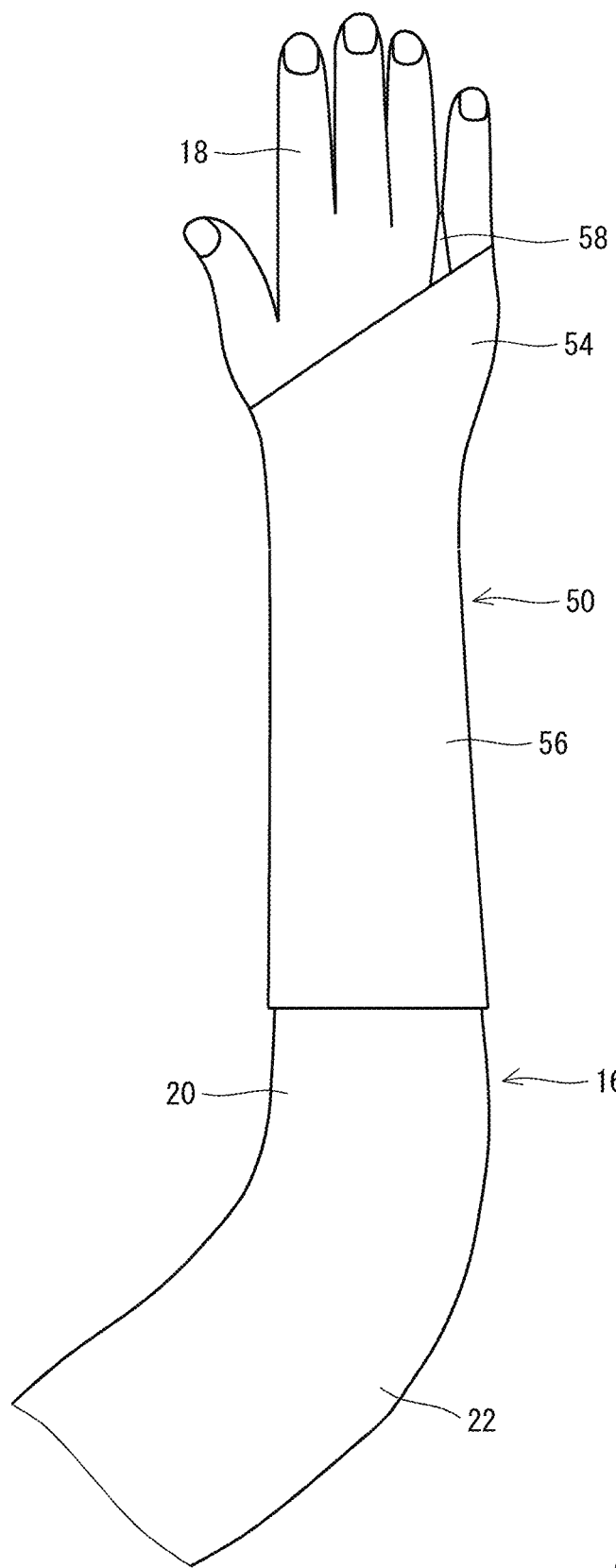
FIG. 13 is a front view showing a pointing device operating sleeve according to another embodiment together with the upper limb of the player.

FIG. 13 is a front view showing a pointing device operating sleeve 50 according to another embodiment together with the upper limb 16 of the player. The sleeve 50 includes a palm cover 54, an arm cover 56, and a band 58. The structure of the palm cover 54 is the same as the structure of the palm cover 4 of the sleeve 2 shown in FIG. 5. The structure of the band 58 is the same as the structure of the band 8 of the sleeve 2 shown in FIG. 5.

It is clear from the comparison of FIG. 5 and FIG. 13 that the arm cover 56 in FIG. 13 is shorter. The arm cover 56 covers a part of the forearm 20. The arm cover 56 does not cover the upper arm 22. The sleeve 50 can also contribute to the protection of the thenar eminence 40 and the hypothenar eminence 42. The sleeve 50 can also contribute to the slidability of the hand 18 and the forearm 20 of the player.

Figure 14:
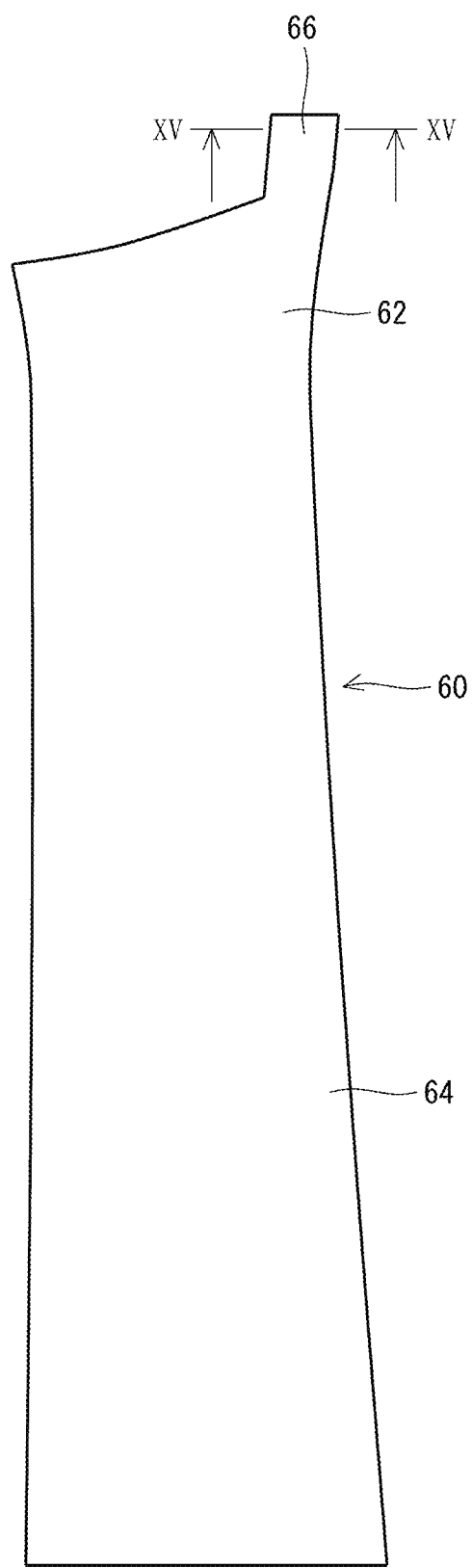
FIG. 14 is a front view showing a pointing device operating sleeve according to yet another embodiment.
Figure 15:
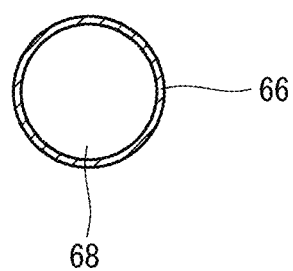
FIG. 15 is a sectional view taken along line XV-XV of FIG. 14.

FIG. 14 is a front view showing a pointing device operating sleeve 60 according to yet another embodiment, and FIG. 15 is a sectional view taken along line XV-XV of FIG. 14. The sleeve 60 includes a palm cover 62 and an arm cover 64. The structure of the palm cover 62 is the same as the structure of the palm cover 4 of the sleeve 2 shown in FIG. 5. The structure of the arm cover 64 is the same as the structure of the arm cover 6 of the sleeve 2 shown in FIG. 5.

The sleeve 60 further includes a tube 66 as a stopper. The tube 66 is integrated with the palm cover 62. As shown in FIG. 15, the tube 66 includes a hole 68.

Figure 16:
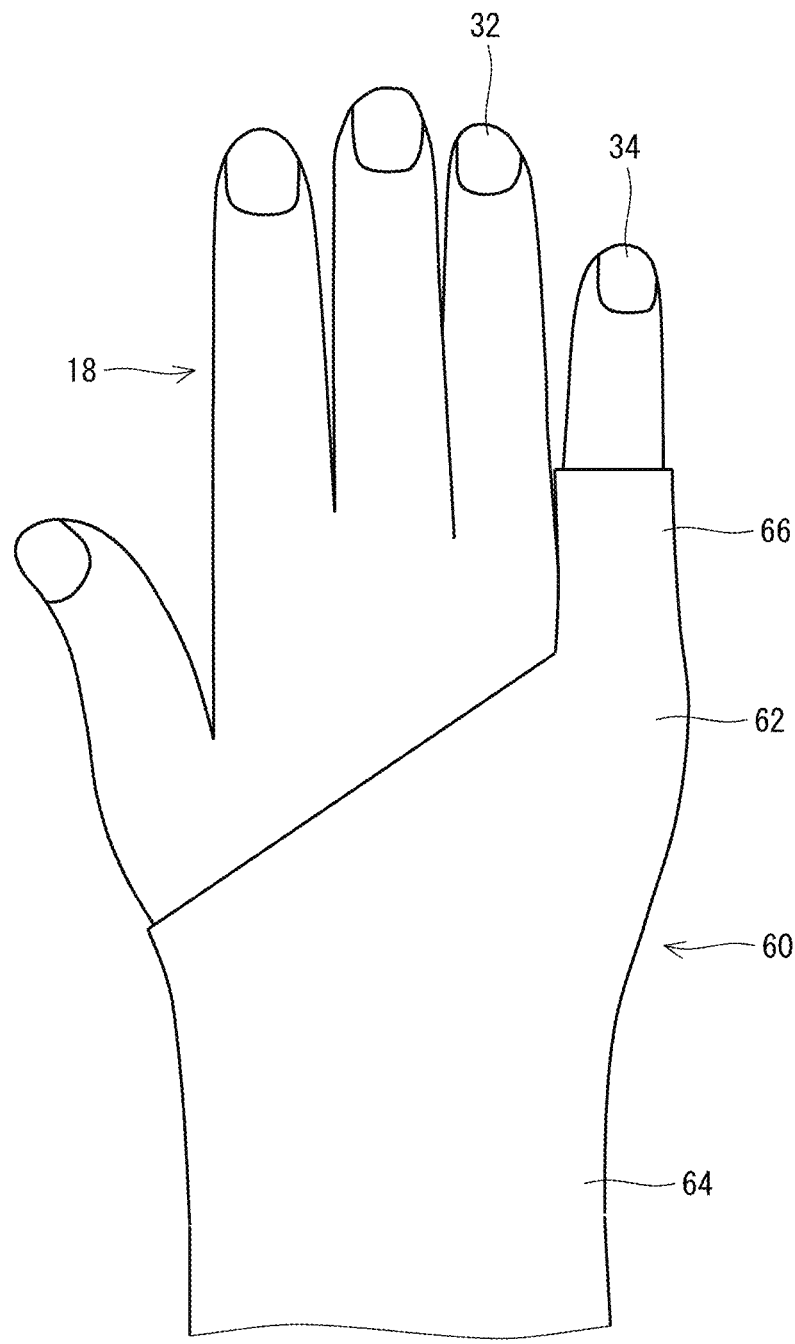
FIG. 16 is a front view showing, in an enlarged manner, a part of the pointing device operating sleeve of FIG. 14 together with the hand of the player.
Figure 17:
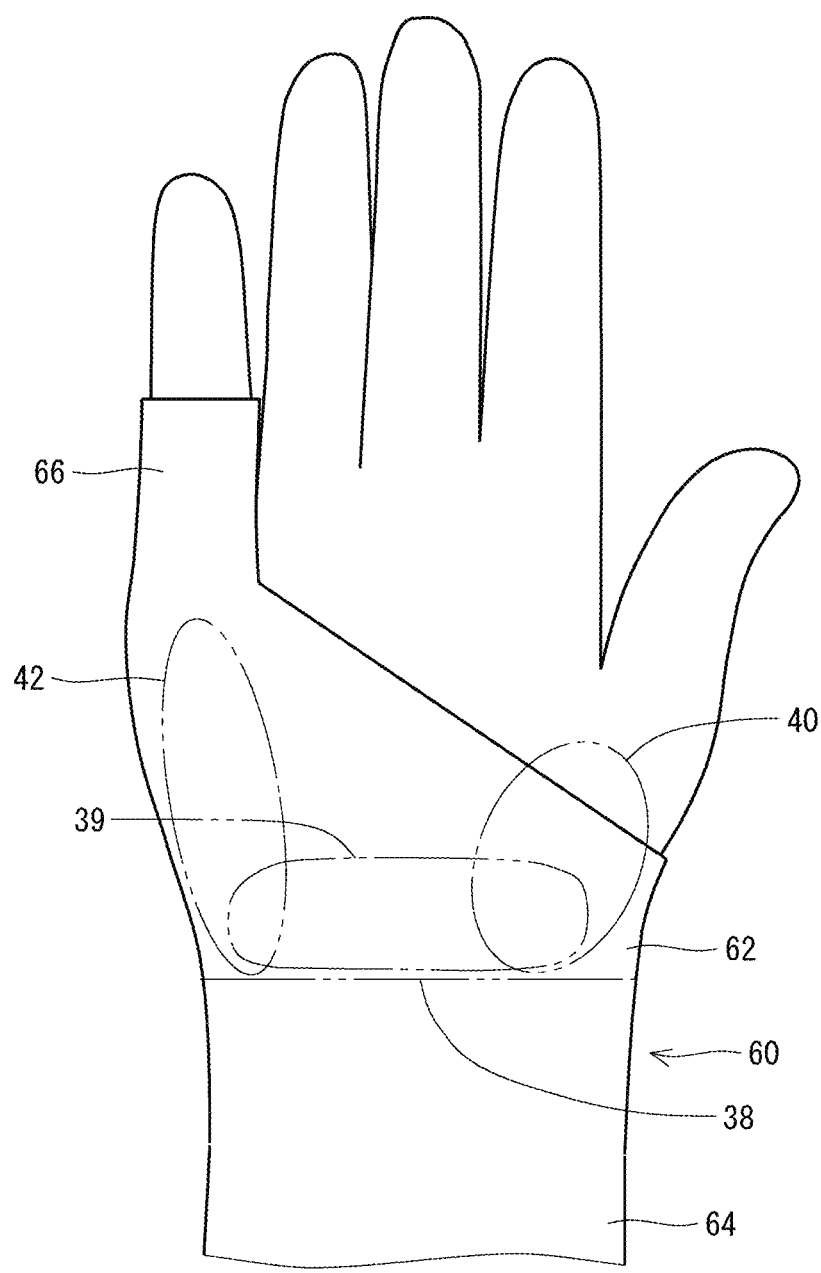
FIG. 17 is a rear view showing, in an enlarged manner, a part of the pointing device operating sleeve of FIG. 14 together with the hand of the player.

FIG. 16 is a front view showing, in an enlarged manner, a part of the sleeve 60 of FIG. 14 together with the hand 18 of the player, and FIG. 17 is a rear view thereof. In FIGS. 16 and 17, the little finger 34 is passed through the hole 68 (see FIG. 15). The tube 66 covers a part of the little finger 34. Since the tube 66 is integrated with the palm cover 62, the tube 66 suppresses displacement of the palm cover 62 from the palm. The sleeve 60 may include the hole 68 through which the ring finger 32 is passable. The sleeve 60 may include the hole 68 through which the little finger 34 and the ring finger 32 are passable. Preferably, the sleeve 60 includes the hole 68 through which only the little finger 34 is passed.

It is clear from FIG. 17 that the palm cover 62 covers the entire palm heel 39. The palm cover 62 further covers a part of the thenar eminence 40 and the entire hypothenar eminence 42. The palm cover 62 protects the thenar eminence 40 and the hypothenar eminence 42. The palm cover 62 may cover the entire thenar eminence 40. The palm cover 62 may cover a part of the hypothenar eminence 42.

EXAMPLES

Hereinafter, advantageous effects of the present invention will become apparent according to Examples. However, the present invention should not be restrictively construed based on the description of these Examples.

Example 1

The pointing device operating sleeve shown in FIGS. 1 to 12 was obtained. The sleeve includes the band as a stopper. The dimensions of the sleeve were as shown below.
Distance Lo: 400 mm
Distance Li: 370 mm
Difference D: 30 mm
Width W: 8 mm Example 2

A sleeve of Example 2 was obtained in the same manner as Example 1, except that the structure shown in FIGS. 14 to 17 was adopted as the structure of the stopper.

Comparative Example

A sleeve of Comparative Example was obtained in the same manner as Example 1, except that the sleeve was provided with no stopper.

[Evaluation]

A low sensitivity player wore each sleeve and played an e-sport (a shooting game). A displacement of the sleeve was observed in Comparative Example, but no displacement of the sleeve was observed in Examples 1 and 2. The player evaluated the sleeve of Example 1 as "least hindering to the play". This result clearly indicates the superiority of the sleeve according to each Example.

[Disclosure Items]

The following items each disclose a preferred embodiment.

[Item 1]

A pointing device operating sleeve including: a palm cover configured to cover a heel of a palm; an arm cover configured to cover at least a part of a forearm, the arm cover being continuous with the palm cover; and a stopper that suppresses displacement of the palm cover from the palm.

[Item 2]

The sleeve according to item 1, wherein the palm cover is configured to cover at least a part of a thenar eminence of the palm and at least a part of a hypothenar eminence of the palm.

[Item 3]

The sleeve according to item 1 or 2, wherein the stopper forms a hole through which a little finger or a ring finger is passable.

[Item 4]

The sleeve according to any one of items 1 to 3, wherein the palm cover is tubular, and a diameter of the palm cover increases from a wrist toward fingertips.

[Item 5]

The sleeve according to any one of items 1 to 4, wherein the arm cover is tubular, and a diameter of the arm cover decreases from an elbow toward a wrist.

[Item 6]

The sleeve according to any one of items 1 to 5, wherein the arm cover is configured to cover at least a part of an upper arm.

[Item 7]

The sleeve according to any one of items 1 to 6, wherein the palm cover or the arm cover has elasticity.

[Item 8]

The sleeve according to any one of items 1 to 7, wherein the palm cover or the arm cover has a low frictional property.

[Item 9]

The sleeve according to any one of items 1 to 8, wherein a length of an outside of the sleeve is greater than a length of an inside of the sleeve.

[Item 10]

The sleeve according to any one of items 1 to 9, wherein the palm cover includes an opening, and the opening extends from an inside of the sleeve to an outside of the sleeve in a direction toward fingertips.

[Item 11]

The sleeve according to item 10, wherein a height difference D between the outside and the inside of the opening is greater than or equal to 5 mm.

[Item 12]

The sleeve according to any one of items 1 to 11, wherein the stopper is attachable to and detachable from the palm cover.

INDUSTRIAL APPLICABILITY

The above-described sleeve is suitable for use by various e-sports players. This sleeve is also suitable for use in different applications other than e-sports.

REFERENCE SIGNS LIST

2 . . . sleeve
4 . . . palm cover
6 . . . arm cover
8 . . . band
10 . . . first opening
12 . . . second opening
14 . . . hole
32 . . . ring finger
34 . . . little finger
38 . . . wrist crease
39 . . . palm heel
40 . . . thenar eminence
42 . . . hypothenar eminence
50 . . . sleeve
54 . . . palm cover
56 . . . arm cover
58 . . . band
60 . . . sleeve
62 . . . palm cover
64 . . . arm cover
66 . . . tube
68 . . . hole

The invention claimed is:

1. A pointing device operating sleeve comprising:
a palm cover configured to cover a heel of a palm;
an arm cover configured to cover at least a part of a forearm, the arm cover being continuous with the palm cover; and
a stopper that suppresses displacement of the palm cover from the palm, wherein
the palm cover includes an opening, and
the opening extends from an inside of the sleeve to an outside of the sleeve in a direction toward fingertips in its entirety.

2. The sleeve according to claim 1, wherein
the palm cover is configured to cover at least a part of a thenar eminence of the palm and at least a part of a hypothenar eminence of the palm.

3. The sleeve according to claim 1, wherein
the stopper forms a hole through which a little finger or a ring finger is passable.

4. The sleeve according to claim 1, wherein
the palm cover is tubular, and a diameter of the palm cover increases from a wrist toward fingertips.

5. The sleeve according to claim 1, wherein
the arm cover is tubular, and a diameter of the arm cover decreases from an elbow toward a wrist.

6. The sleeve according to claim 1, wherein
the arm cover is configured to cover at least a part of an upper arm.

7. The sleeve according to claim 1, wherein
the palm cover or the arm cover has elasticity.

8. The sleeve according to claim 1, wherein
the palm cover or the arm cover has a low frictional property.

9. The sleeve according to claim 1, wherein
a length of an outside of the sleeve is greater than a length of an inside of the sleeve.

10. The sleeve according to claim 1, wherein
a height difference D between the outside and the inside of the opening is greater than or equal to 5 mm.

11. The sleeve according to claim 1, wherein the stopper is attachable to and detachable from the palm cover.

* * * * *